(12) United States Patent
Kim et al.

(10) Patent No.: US 7,115,683 B2
(45) Date of Patent: Oct. 3, 2006

(54) ORGANIC-INORGANIC NANOCOMPOSITE AND PREPARATION THEREOF

(75) Inventors: Hee-Jung Kim, Daejeon (KR); Dong-Ryul Kim, Daejeon (KR)

(73) Assignee: LG Chem, Ltd., (KR)

( * ) Notice: Subject to any disclaimer, the term of this patent is extended or adjusted under 35 U.S.C. 154(b) by 358 days.

(21) Appl. No.: 10/473,915

(22) PCT Filed: Jan. 22, 2003

(86) PCT No.: PCT/KR03/00140

§ 371 (c)(1),
(2), (4) Date: Oct. 3, 2003

(87) PCT Pub. No.: WO03/066686

PCT Pub. Date: Aug. 14, 2003

(65) Prior Publication Data

US 2004/0259998 A1    Dec. 23, 2004

(30) Foreign Application Priority Data

Feb. 4, 2002    (KR) ................. 10-2002-0006216
Jan. 10, 2003   (KR) ................. 10-2003-0001520

(51) Int. Cl.
*C08K 3/34*    (2006.01)
(52) U.S. Cl. ............... 524/789; 524/445; 524/447; 524/449
(58) Field of Classification Search ........... 524/445, 524/447, 449, 789
See application file for complete search history.

(56) References Cited

U.S. PATENT DOCUMENTS

| | | | |
|---|---|---|---|
| 4,739,007 A | 4/1988 | Okada et al. ........ | 524/789 |
| 4,810,734 A | 3/1989 | Kawasumi et al. .... | 523/216 |
| 4,889,885 A | 12/1989 | Usuki et al. ........ | 524/445 |
| 4,894,411 A | 1/1990 | Okada et al. ........ | 524/710 |
| 5,554,670 A | 9/1996 | Giannelis et al. .... | 523/209 |
| 5,780,376 A | 7/1998 | Gonzales et al. ..... | 501/146 |

FOREIGN PATENT DOCUMENTS

| | | |
|---|---|---|
| JP | 48-103653 | 12/1973 |
| WO | WO 98/01478 | 1/1998 |
| WO | WO 99/05099 | 2/1999 |
| WO | WO 99/31144 | 6/1999 |
| WO | WO 00/35177 | 6/2000 |

OTHER PUBLICATIONS

"Synthesis of Polycarbonate-Layered Silicate Nanocomposites via Cyclic Oligomers"; Authors: Xinyu Huang, Stewart Lewis, William J. Brittain and Richard A. Vala; American Chemical Society; Macromolecules, vol. 33; 2000; pp. 2000-2004.
"Living Free-Radical Polymerization by Reversible Addition-Fragmentation Chain Transfer: The RAFT Process"; Authors: John Chiefari, et al.; American Chemical Society; Macromolecules, vol. 31; 1998; pp. 5559-5562.
PCT International Search Report; International application No. PCT/KR03/00140; International filing date: Jan. 22, 2003; Mailing date: Apr. 8, 2003.

*Primary Examiner*—Peter Szekely
(74) *Attorney, Agent, or Firm*—Cantor Colburn LLP (57) ABSTRACT

The present invention relates to an organic-inorganic nanocomposite and preparation thereof and particularly to a method for preparing an organic-inorganic nanocomposite capable of uniformly dispersing a silicate compound in a polymer medium by adding monomers, an initiator, and an emulsifier to an ion-exchanged layered silicate salt that is prepared by adding a cationic initiator and a cationic chain transfer agent to a layered silicate compound to cause polymerization.

18 Claims, 2 Drawing Sheets

ORGANIC-INORGANIC NANOCOMPOSITE AND PREPARATION THEREOF

BACKGROUND OF THE INVENTION (a) Field of the Invention

The present invention relates to an organic-inorganic nanocomposite and preparation thereof, and particularly to an organic-inorganic nanocomposite capable of uniformly dispersing layered silicates in a polymer medium, and preparation thereof.

(b) Description of the Related Art

Generally, a method of mixing inorganic substances is used for synthesizing a polymer having high strength and high rigidity. In this method, as an added inorganic substance, a plate-shaped or a vinyl-shaped substance is more appropriate for improving physical properties than a globular one because it increases surface area per unit mass. For this reason, various efforts to intercalate polymers into layered silicates have been attempted. Recently, U.S. Pat. No. 4,810,734 disclosed an organic-inorganic composite using layered silicates and nylon, and as physical and thermal properties thereof have been improved, studies of nanocomposites have attracted further attention.

It is regarded that the degree of exfoliation of a layered silicate primarily influences the improvements of the physical properties of a polymer by an organic-inorganic nanocomposite. However, it is not an easy task to completely exfoliate the layered silicates in the polymer medium because of low compatibility between them. Therefore, in order to solve the problem, many studies for dispersing layered silicates in a polymer medium have been attempted.

In U.S. Pat. No. 4,889,885 and Macromolecule 2000, 33. 2000~2004, Polymer 1994, 35, 3296~3304, sodium ions or potassium ions of layered silicate were ion-exchanged with a cationic compound (organosilane compound having alkylammonium ions or appropriate functional groups) to make organoclay, and the distance between layers was widened and then appropriate monomers were added to polymerize, or it was melt-intercalated to cause exfoliation. However, there was a problem in that the degree of exfoliation differs depending on the polymers to be intercalated.

Recently, results of synthesis of nanocomposites wherein layered structures of silicate were exfoliated in polymer media through introduction of organophilic intercalants having reactive groups and subsequent polymerization have been announced. However, with these methods it is difficult to produce a polymer because sufficient radicals and monomers cannot be continuously provided into the layered structure, and even if produced, there is a limit on exfoliation of the layered silicate because the molecular weight and the structure cannot be controlled.

Recently, the Sogah group synthesized a polystyrene-inorganic nanocomposite with a significantly improved exfoliation degree by intercalating nitroxide in which ammonium substituents were introduced into a layered silicate, and by introducing living polymerization inside the inorganic substance (J. Am. Chem. Soc 1999, 121. 1615~1616). However, this method has the disadvantage of only being applicable to some limited monomers, and it requires high temperature conditions. Additionally, Moad et al have synthesized dithioester compounds and shown that the living polymerization method can be applied to various monomers (Macromolecules 31, 5559(1998), WO 98/01478, WO 99/05099, WO 99/31144, WO 00/35177), but studies of preparation of organic-inorganic nanocomposites using the same are totally lacking.

Accordingly, there is a need for study of preparation of organic-inorganic nanocomposites capable of uniformly dispersing layered silicates in various kinds of polymer media.

SUMMARY OF THE INVENTION

In order to solve these problems, it is an object of the present invention to provide an organic-inorganic nanocomposite composition wherein layered silicates are uniformly dispersed in a polymer medium.

It is another object of the present invention to provide a method for preparing an organic-inorganic nanocomposite capable of uniformly dispersing layered silicates in various kinds of polymer media.

In order to achieve these objects, the present invention provides an organic-inorganic nanocomposite, comprising a) a layered silicate salt, wherein
i) a cationic initiator and
ii) a cationic chain transfer agent are ion-exchanged for a layered silicate compound; and
b) a polymer medium.

In addition, the present invention also provides a method for preparing an organic-inorganic nanocomposite, comprising the steps of a) adding a cationic initiator and a cationic chain transfer agent to a layered silicate compound and causing an ion-exchange reaction to prepare an ion-exchanged layered silicate salt; and b) adding monomers, an initiator, and an emulsifier to the ion-exchanged layered silicate salt prepared in step a) to polymerize.

DETAILED DESCRIPTION AND THE PREFERRED EMBODIMENTS

The present invention will now be explained in detail.

The present inventors added a cationic initiator and a cationic chain transfer agent to a layered silicate compound and caused an ion-exchange reaction to prepare an ion-exchanged layered silicate salt, and added monomers, an initiator, and an emulsifier to the ion-exchanged layered silicate salt and polymerized it, while studying methods for uniformly dispersing a layered silicate compound in a polymer medium. As a result, it was determined that a layered silicate compound can be uniformly dispersed in various kinds of polymer media, and the present invention was completed.

The present invention provides an organic-inorganic nanocomposite composition comprising an ion-exchanged layered silicate salt comprising a cationic initiator, a cationic chain transfer agent, and a layered silicate compound; and a polymer medium, and an organic-inorganic nanocomposite composition further comprising an initiator and an emulsifier in addition to the above ingredients.

More particularly, the composition of the present invention comprises a) 1 to 150 weight parts of an ion-exchanged layered silicate salt, wherein
  i) 10 to 100 moles of cationic initiators, and
  ii) 10 to 100 moles of a cationic chain transfer agent are ion-exchanged for 100 moles of a layered silicate compound;
b) 100 weight parts of a polymer medium;
c) 0.01 to 10 weight parts of an initiator; and
d) 0.001 to 10 weight parts of an emulsifier.

The a) i) cationic initiator used in the present invention is represented by the following Chemical Formula 1 or Chemical Formula 2:

[Chemical Formula 1]

In the Chemical Formula 1,

$A_1$, and $A_2$ are independently a hydrogen, a $C_{1-6}$ alkyl group, or cyano group, $A_3$, and $A_4$ are independently an alkyl, alkenyl, aryl, heteroaromatic, or heterocyclyl which contains or does not contain substitutents are selected from the group of ester, keto, ether, and amide, and at least one of $A_3$, and $A_4$ contains an ammonium salt represented by the Chemical Formula 4 or the Chemical Formula 5 having a cationic substituent at its end:

[Chemical Formula 2]

In the Chemical Formula 2, $T_1$ and $T_2$ are independently a hydrogen, alkyl, alkenyl, aryl, heteroaromatic, or heterocyclyl which contains or does not contain substitutents are selected from the group of ester, keto, ether, and amide, and at least one of $T_1$ and $T_2$ contains an ammonium salt represented by the Chemical Formula 4 or the Chemical Formula 5 having a cationic substituent at its end,

[Chemical Formula 4]

In the Chemical Formula 4:

$R^4$, $R^5$, and $R^6$ are independently an alkyl which contains branched, normal saturated or unsaturated, alkyl which contain aryl substitutent, alkoxyalkyl, cyanoalkyl, or hydroxyalkyl, X is a halide or a sulfate having a functional group capable of forming a salt or an anion,

[Chemical Formula 5]

In the Chemical Formula 5,

The hetero ring is ring compound having 5,6-square shape, and can be contained independently alkyl, or alkene,
  nitrogen can be 1 to 3, and preferably the third nitrogen chemical, Q is a halide or a sulfate having a functional group capable of forming a salt or an anion.

The a) ii) cationic chain transfer agent used in the present invention is a cationic chain transfer agent capable of living radical polymerization, represented by the following Chemical Formula 3:

[Chemical Formula 3]

In the Chemical Formula 3,

Z is a hydrogen, a chlorine, an alkyl, an aryl, an alkylthio, an alkoxycarbonyl, an aryoxycarbonyl (—COOR"), an carboxy (—COOH), an acyloxy (—O$_2$CR"), a cabamoyl (—CONR"), a cyano (—CN), a dialkyl-phosphonato, a diaryl-phosphonato (—P(=O)OR'$_2$), a dialkyl-phosphinato, a diaryl-phosphinato (—P(=O)R$_{12}$) which contains or does not contain substitutents, R" is $C_{1-18}$ alkyl, $C_{2-18}$ alkenyl, aryl, heterocyclyl, aralkyl, or alkylaryl which contains or does not contain substitutents are selected from the group of hydrogen, ester, keto, amide, ether, thio, hydroxy, cyano, siyl, haloyl, and dialkylamino, $R^1$ is $C_{1-18}$ alkyl, $C_{2-18}$ alkenyl, aryl, heterocyclyl, aralkyl, or alkylaryl which contains or does not contain substitutents are selected from the group of hydrogen, ester, keto, amide, ether, thio, hydroxy, cyano, siyl, haloyl, and dialkylamino, and $R^2$, and $R^3$ are independently $C_{1-18}$ alkyl, $C_{2-18}$ alkenyl, aryl, heterocyclyl, aralkyl, or alkylaryl which contains or does not contain substitutents are selected from the group of epoxy, alkoxycarbonyl, aryloxycarbonyl, isocyanto, cyano, siyl, hoal, and dialkylamino, and at least one of $R^2$, and $R^3$ contains an ammonium salt represented by the Chemical Formula 4 or the Chemical Formula 5 having a cationic substituent at its end.

The a) layered silicate compound used in the present invention is a layered inorganic substance capable of swelling in water, and adding a small amount thereof can increase its barrier property due to its high aspect ratio (ratio of length/width). The layered silicate used in the present invention is natural or synthesized, and has an anion capable of ion-exchange reaction. The shape of the silicate may be flat or rather curved. Representative examples are selected from a group consisting of sodium montmorillonite, magnesium montmorillonite, calcium montmorillonite, nontronite, beidellite, volkonskoite, hectorite, saponite, saauconite, magadite, medmonite, kenyaite, vermiculite, sobockite, stevensite, rectonite, tarosovite, ledikite, and a mixture thereof.

The layered silicate compound is preferably contained in an amount of 1 to 150 weight parts per 100 weight parts of a polymer medium, more preferably in an amount of 1 to 100 weight parts, and most preferably in an amount of 1 to 30 weight parts.

The a) ion-exchanged layered silicate salt used in the present invention comprises X moles of a cationic initiator and Y moles of a cationic chain transfer agent for layered silicate, wherein X number of moles+Y number of moles≧ion exchange equivalent (CEC) of layered silicate, and preferably Y number of moles≧X number of moles×0.6.

The b) polymer medium used in the present invention contains a vinyl monomer and is represented by the Chemical Formula 5:

[Chemical Formula 5]

In the Chemical Formula 5,

U is hydrogen, a halogen, a $C_{1-4}$ alkyl containing substituents such as a hydroxy, an alkoxy, an aryloxy, a carboxy, an acyloxy, an aroyloxy, an alkoxy-carbonyl, or aryloxy-carbonyl, and V is hydrogen, an alkyl, a carboxylic acid, a cyanyl, an alkylamide, an amide alkoxy, a carbonyl aroyloxy, or an aryloxy carbonyl.

The polymer medium is preferably a vinyl monomer, and representative examples include styrene, α-methylstyrene, vinyl toluene, and an isomer thereof; ethylstyrene and an isomer thereof; propylene styrene, isopropylstyrene, vinyl biphenyl, vinyl naphthalene, vinyl anthracene; N,N-aminostyrene, aminostyrene, t-butylstyrene, trifluoro methylstyrene, cyanostyrene, nitrostyrene, chloromotheylstyrene, potassium styrene sulfonic acid, and sodium styrene sulfonic acid; an unsaturated monomer having a carboxylic group such as acrylic acid, methacrylic acid, crotonic acid, itaconic acid, maleic acid, or fumaric acid; a C2–8 hydroxyalkyl ester of methacrylate such as 2-hydroxyethyl (methacrylate, 2-hydroxypropyl methacrylate, 3-hydroxypropyl methacrylate, or hydroxybutyl methacrylate; a combination of glycidyl methacrylate, acetic acid, propionic acid, a fatty acid, and 4-butylbenzoic acid; a monoester or a diester of glycol and maleic anhydride or itaconic anhydride; a monomer having chlorine or a hydroxy group such as 3-chloro-2-hydroxypropyl methacrylate; a C1–24 alkyl ester or a cycloalkyl ester of methacrylate such as methylmethacrylate, isopropyl methacrylate, n-, i-, t-butyl methacrylate, 2-ethylhexylmethacrylate, isobornyl methacrylate, n-octyl methacrylate, decyl methacrylate, stearyl methacrylate, lauryl methacrylate, or cyclo methacrylate; a linear alkyl vinyl ether; a cyclo alkyl vinyl ether; an allyl vinyl ether; an allyl alkyl vinyl ether; an alkyl ether such as allyl glycidyl ether or alkyl ethyl ether; an olefin or diene compound such as ethylene, propylene, butylkene, butadiene, isoprene, or chloroprene; and an unsaturated monomer having an hydrocarbon ring such as cyclohexyl methacrylate; an alkyl methacrylate containing nitrogen; an aromatic monomers containing nitrogen; a nitrile monomer such as N,N-dimethyl aminoethylmethacrylate, N,N-diethyl aminoethylmethacrylate, N-methylacrylamide, N,N-dimethylacrylamide, N-tert-butylmethacrylamide, N-n-butylmethacrylamide, N-methylolmethacrylamide, N-ethylolmethacrylamide, acrylo-nitrile, or methacrylonitrile; vinyl monomers containging glycidyl group; a vinyl monomer containing alkoxy silyl group such as trimethoxysilylpropyl methacrylate, triethoxysilylpropyl methacrylate, tributoxysilylpropyl methacrylate, diethoxymethylsilylpropyl methacrylate, dibutoxymethylsilylpropyl methacrylate, diisopropoxymethylsilylpropyl methacrylate, dibutoxysilylpropyl methacrylate, diisopropoxysilylpropyl methacrylate, dimethoxysilylpropyl methacrylate, diethoxysilylpropyl methacrylate, or dimethoxymethylsilylpropyl methacrylate; a vinyl acetate; a vinyl butyrate; a vinyl benzoate; a vinyl chloride; a vinyl fluoride; a vinyl bromide; a N-phenylmaleimide; a N-butylmaleimide; a N-vinylpyrolidone; or N-vinylcarbazole.

The c) initiator used in the present invention has an appropriate half life at the polymerization temperature, and those derived by heat, those spontaneously produced from monomers, or those produced by photochemical reaction can be used. Representative examples of an initiator that can be used for radical polymerization are peroxide or an azo type.

Examples include benzoyl peroxide, di-tert-butyl hydroperoxide, tert-butyl hydroperoxide, cumyl peroxide, cumene hydroperoxide, diisopropyl benzene hydroperoxide, di-tert-butyl peroxybenzoate, lauryl peroxide, hydrogen peroxide, azobis isobutyronitrile, azobisdimethyl valeronitrile, azobis cyclohexene carbonitrile, 2,2-azobis(isobutyronitrile), 2,2-azobis(2-cyano-2-butane), dimethyl 2,2-azobisdimethylisobutyrate, 4,4-azobis(4-cyanopentanoic acid), 1,1-azobis (cyclohexanecarbonitrile), 2-(tert-butylazo)-2-cyanopropane, 2,2-azobis[2-methyl-N-(1,1)-bis (hydroxymethyl)-2-hydroxyethyl]propioamide, 2,2-azobis-(2-methyl-N-hydroxyethyl)propioamide, 2,2-azobis(N,N-dimethylisobutylamidine)-dihydrochloride, 2,2-azobis(2-amidinopropane)dihydrochloride, 2,2-azobis(N,N-dimethyleneisobutyramine), 2,2-azobis[2-methyl-N-[(1,1)-bis(hydroxymethyl)-2-hydroxyethyl]propioamide, 2,2-azobis(2-methyl-N-[1,1-bis (hydroxymethyl)ethyl] propioamide, 2,2-azobis[2-methyl-N-(2-hydroxyethyl) propioamide], 2,2-azobis(isobutyramide)dihydrate, 2,2-azobis(2,2,4-trimethylpentane), 2,2-azobis(2-methylpropane), tert-butyl peroxyacetate, ter-butyl-peroxyoctate, ter-butyl-peroxy neodecanoate, tert-butylperoxy isobutyrate, tert-amyl peroxypivalate, tert-butyl peroxypivalate, tert-butyl peroxypivalate, diisopropyl peroxydicarbonate, dicyclohexyl peroxydicarbonate, dicumyl peroxide, potassium peroxydisulfate, ammonium peroxydisulfate, di-t-butyl hyponitrile, and dicumyl hyponitrile.

The d) emulsifier functions to increase stability of particles formed during polymerization, and examples include an anionic emulsifier such as alkyl phosphate, alkyl sulfosuccinate, allylsulfonate, vinylsulfonate, alkyl aryl sulfonate, alkyl sulfonate, ethyoxylated alkyl sulfate, alkyl sulfate, or fatty acid soap; a cationic emulsifier such as halide alkyl ammonium, alkyl ammonium, vinyl ammonium, alkyl aryl ammonium, alkyl sulfonium, or alkyl phosphonium; and a non-ionic emulsifier such as polyhydric alcohol, glycerin, or polyethylene glycol.

In addition, the preparation of the organic-inorganic nanocomposite of the present invention is characterized by adding a cationic initiator and a cationic chain transfer agent to a layered silicate compound and causing an ion exchange reaction to intercalate a cationic initiator and a cationic chain transfer agent into the layered silicate, and then adding monomers, an initiator, and an emulsifier thereto to cause polymerization.

The preparation method of the present invention will now be explained in detail.

(Preparation of an Ion-Exchanged Layered Silicate Salt)

A cationic initiator and a cationic chain transfer agent capable of cation living polymerization are substituted in a layered silicate compound capable of swelling in water, through an ion exchange reaction. After the cationic initiator and the cationic chain transfer agent are sufficiently intercalated into layers of the silicate compound, unsubstituted organic substances and salt produced by ion exchange are washed with water to remove them.

For practical emulsion polymerization, unreacted organic substances and produced salt need not be removed.

(Polymerization)

In order to remove oxygen from inside a reactor, nitrogen is injected therein for 30 minutes or more, and, on the basis of 100 weight parts of monomer, 50 to 1000 weight parts of water, 1 to 100 weight parts of layered silicate salt that is ion-exchanged with the initiator and an cationic chain transfer agent capable of living radical polymerization, 0.01 to 10 weight parts of an initiator, and 0.5 to 10 weight parts of an emulsifier are added to initiate reaction. Agitation speed is preferably 10 to 1,000 rpm, and temperature is preferably 20 to 120° C., and more preferably 30 to 100° C.

The emulsifier may be added before or during the reaction in order to improve stability, and common emulsion polymerization methods such as batch, semi-batch, and continuous polymerization can be used.

After the reaction is terminated, a mixture of polymer latex and inorganic particles dispersed in water is obtained. The amount of polymer latex produced in water can be controlled by reaction conditions, which are not specifically limited in the present invention.

The latex is obtained as powder through a coagulation process, a washing process, and a drying process; and various additives used in polymer processing such as a heat stabilizer, UV stabilizer, etc. are mixed and melted in an extruder to obtain a final pellet.

Meanwhile, if contents of inorganic substances and silicate compounds are high during polymerization, the contents of silicate compounds in the organic polymer can be controlled to a desired concentration by mixing resin having the same composition, said method being more favorable in terms of productivity.

The dispersibility of inorganic particles of the organic-inorganic nanocomposite prepared by the method of the present invention was confirmed using a transmission electronic microscope.

The present invention will now be explained in more detail with reference to the following Examples and Comparative Example. However, these are to illustrate the present invention and the present invention is not limited to them.

EXAMPLE

Example 1

(Preparation of Ion-Exchanged Layered Silicate)

The temperature of 400 g (2.5 wt %) of a slurry of synthetic mica (Si:Mg:Al:Na=26.5:15:6:0.2:4.1 (wt %)) swollen in water was maintained at 10° C. 4.8 g (6 mmol) of the cationic initiator [di(3-dimethylbenzylammoniopropyl)4,4'-dzobis(4-cyanopentanoate)dibromide] and 3.5 g (7 mmol) of a cationic chain transfer agent capable of living radical polymerization, that is, 4-cyano-4(thiobenzylthio) pentanoic trimethylammonium ethyl ester chloride, were respectively prepared in an aqueous solution at 3 wt %, and the two solutions were mixed. The mixed solution was dripped into the synthetic mica-dispersed slurry that was maintained at 10° C. over 2 hours, and it was then agitated for another hour. The solution was washed to remove sodium bromide (NaBr) and sodium chloride (NaCl), and the remaining product was stored (organically modified synthetic mica-A (SM-A)).

(Preparation of Organic-Inorganic Nanocomposite)

26 g of the prepared SM-A (inorganic contents 7.7 wt %) were introduced into a reactor, and then 176 g of water and 40 g of the polymer medium methylmethacrylate (MMA) were added. The mixture was agitated at room temperature for 20 minutes, and polymerized at 80° C. for 2 hours. Then, 6.67 g (3 wt % aqueous solution) of potassium persulfate solution (KPS) and 6.67 g (3 wt % aqueous solution) of sodium bicarbonate ($NaHCO_3$) solution as an initiator, and 16 g (5 wt % aqueous solution) of sodium dodecylsulfate solution were added thereto, respectively, and it was further polymerized for 12 hours to complete the reaction. After termination of the reaction, polymer latex and inorganic particles dispersed in water were coagulated, washed to remove the emulsifier, and then dried to prepare a powdered organic-inorganic mixture.

Example 2

26 g of SM-A prepared in Example 1 (inorganic contents 7.7 wt %) were introduced into a reactor, and 176 g of water, 39.72 g of the polymer medium methylmethacrylate, and 0.28 g of acrylamide were introduced therein. The mixture was agitated at room temperature for 20 minutes, and polymerized at 80° C. for 2 hours. Then, 6.67 g (3 wt % solution) of potassium persulfate solution and 6.67 g (3 wt % solution) of sodium bicarbonate solution as an initiator, and 16 g (5 wt % solution) of sodium dodecylbenzene sulfonate solution were added thereto, respectively, and it was further polymerized for 12 hours to complete the reaction. After termination of the reaction, polymer latex and inorganic particles dispersed in water were coagulated, washed to remove the emulsifier, and then dried to prepare a powdered organic-inorganic mixture.

Example 3

(Preparation of Ion-Exchanged Layered Silicate)

The temperature of 400 g of a slurry of synthetic mica (Si:Mg:Al:Na=26.5:15.6:0.2:4.1 (wt %)) swollen in water was maintained at 10° C. As a cationic initiator, 1.9 g of 2,2-azobis-[2-(2-imidazolin-2-yl-N-methyl)propane]dihydrochloride and 3.5 g (7 mmol) of 4-cyano-4-(thiobenzylthio)pentanoic trimethylammonium ethyl ester chloride were respectively prepared in 2 wt % aqueous solutions, respectively, and the two solutions were mixed. The mixed solution was dropped into the synthetic mica-dispersed slurry that was maintained at 10° C. over 2 hours, and further agitated for 1 hour. The mixture was washed to remove NaBr and NaCl and the remaining product was stored (organically modified synthetic mica-B (SM-B)).

(Preparation of Organic-Inorganic Nanocomposite)

26 g of the prepared SM-B (inorganic contents 7.7 wt %) were introduced in a reactor, and 176 g of water and 39.72 g of methylmethacrylate and 0.28 g of acrylamide as a polymer medium were introduced therein. The mixture was agitated at room temperature for 20 minutes, and polymerized at 60° C. for 4 hours. 4 g (3 wt % solution) of potassium persulfate solution and 4 g (3 wt % solution) of sodium bicarbonate solution as an initiator, and 16 g (5 wt %) solution) of sodium dodecylbenzene sulfonate solution were added thereto, and it was further polymerized for 4 hours to complete the reaction. After termination, polymer latex and inorganic particles dispersed in water were coagulated and washed to remove the emulsifier, and then dried to prepare a powdered organic-inorganic mixture.

Example 4

20 g of SM-B (10 wt %) prepared in Example 3 were introduced into a reactor, and 176 g of water and 36 g of methylmethacrylate, 4 g of methylacrylate and 0.28 g of acrylamide as a polymer medium were introduced therein. The mixture was agitated at room temperature for 20 minutes and polymerized at 60° C. for 4 hours. 3.5 g (2 wt %) of potassium persulfate solution and 3.5 g (3 wt %) of sodium bicarbonate (NaHCO$_3$) solution as an initiator, and 12 g (5 wt %) of sodium dodecylbenzene sulfonate solution were added thereto, and it was further polymerized for 4 hours to complete the reaction. After termination of the reaction, polymer latex and inorganic particles dispersed in water were coagulated, washed to remove the emulsifier, and then dried to prepare a powdered organic-inorganic mixture.

Example 5

40 g (10 wt %) of SM-B prepared in Example 3 were introduced into a reactor, and then 176 g of water and 29 g of methylmethacrylate and 10 g of butylacrylate as a polymer medium were added. The mixture was agitated at room temperature for 30 minutes and polymerized at 55° C. for 4 hours. Then, 0.015 g of AIBN was melted in 1 g of methylmethacrylate to add thereto, and 12 g (5 wt % solution) of sodium dodecylbenzene sulfonate solution were added as an emulsifier. The temperature of the mixture was elevated to 80° C., and it was further polymerized for 12 hours to complete the reaction. After termination of the reaction, polymer latex and inorganic particles dispersed in water were coagulated and washed to remove the emulsifier, and then dried to prepare a powdered organic-inorganic mixture.

Example 6

80 g of SM-B (inorganic contents 10 wt %) prepared in Example 3 were introduced into a reactor, and then 176 g of water and 37.36 g of methylmethacrylate, 2 g of benzylacrylate, and 0.64 g of acrylamide were added. The mixture was agitated at room temperature for 20 minutes, and polymerized at 60° C. for 4 hours. 3.34 g (3 wt % solution) of potassium persulfate solution and 3.34 g (3 wt % solution) of sodium bicarbonate solution as an initiator, and 12 g (5 wt % solution) of sodium dodecylbenzene sulfonate were added thereto, respectively, and it was further polymerized at 80° C. for 6 hours to complete the reaction. After termination of the reaction, polymer latex and inorganic particles dispersed in water were coagulated and washed to remove the emulsifier, and then dried to prepare a powdered organic-inorganic mixture.

Example 7

(Preparation of Ion-Exchanged Layered Silicate)

The temperature of 400 g of a slurry of sodium-montmorillonite (Na-MMT) swollen in water was maintained at 15° C. 3.5 g (7 mmol) of 4-cyano-4-(thiobenzylthio)pentanoic trimethylammonium ethyl ester chloride and 1.9 g of 2,2-azobis-[2-(2-imidazolin-2-yl-N-methyl)propane]dichloride as a cationic chain transfer agent capable of living radical polymerization were respectively prepared in 2 wt % aqueous solutions, and the two solutions were mixed. The mixture was dropped into a sodium-montmorillonite dispersed slurry maintained at 15° C. over 2 hours, and further agitated for 60 minutes. The mixture was washed to remove sodium chloride (NaCl) and the remaining product was stored (organically modified montmorillonite-C (MMT-C)).

(Preparation of Organic-Inorganic Nanocomposite)

23.5 g (17 wt %) of the prepared MMT-C was introduced into a reactor, and 176 g of water, 38 g of methylmethacrylate, 2 g of ethylacrylate and 0.28 g of acrylamide as a polymer medium, and 8 g (5 wt %) of sodium dodecylsulfate solution as an emulsifier were introduced therein. The mixture was agitated at room temperature for 20 minutes and polymerized at 60° C. for 4 hours. 3.34 g (3 wt %) of potassium persulfate solution and 3.34 g (3 wt %) of sodium bicarbonate solution (NaHCO$_3$) were added thereto, respectively, and it was further polymerized at 80° C. for 6 hours to complete the reaction. After terminating the reaction, polymer latex and inorganic particles dispersed in water were coagulated and washed to remove the emulsifier, and then dried to prepare a powdered organic-inorganic mixture.

Example 8

85 g (7 wt %) of ion-exchanged MMT-C prepared in Example 7 were introduced into a reactor, and 123 g of water and 25 g of methylmethacrylate, 15 g of styrene, and 0.28 g of acrylamide as a polymer medium were introduced therein. The mixture was agitated at room temperature for 40 minutes, and polymerized at 60° C. for 4 hours. 3.34 g (3 wt %) of potassium persulfate solution, and 3.34 g (3 wt %) of sodium bicarbonate solution as an initiator and 15 g (5 wt %) of sodium dodecylbenzene sulfonate solution were added thereto, respectively, and it was further polymerized at 80° C. for 6 hours to terminate the reaction. After terminating the reaction, polymer latex and inorganic particles dispersed in water were coagulated and washed to remove the emulsifier, and then dried to obtain a powdered organic-inorganic mixture.

Example 9

The temperature of 400 g of a slurry of Na-MMT swollen in water was maintained at 15° C. As a cationic chain transfer agent capable of living radical polymerization, 3.4 g of 4-cyano-4-(thiobenzylthio)pentanoic trimethylammonium propyl ester chloride and 2.2 g of [4-[(tert-butyldioxy)carbonyl]benzyl]triethylammonium chloride (J. Org. Chem 1995, 60, 5341) were respectively prepared in 2 wt % aqueous solutions, respectively, and the two solutions were mixed. The mixture was dripped into a Na-MMT dispersed slurry that was maintained at 15° C. over 2 hours, and it was further agitated for 60 minutes. The mixture was washed to remove NaCl and the remaining product was stored (organically montmorillonite-P (MMT-P)).

(Preparation of Organic-Inorganic Nanocomposite)

12 g (33 wt %) of the prepared MMT-P was introduced into a reactor, and 176 g of water and 37.72 g of methylmethacrylate, 2 g of ethylacrylate, and 0.28 g of acrylamide as a polymer medium, and 8 g (5 wt %) of sodium dodecylsulfate as an emulsifier, were introduced therein. The mixture was agitated at room temperature for 20 minutes, and polymerized at 60° C. for 4 hours. Aditionally, 3.34 g (3 wt %) of potassium persulfate solution and 3.34 g (3 wt %) of sodium bicarbonate solution were added thereto as an initiator, and it was further polymerized at 80° C. for 6 hours to complete the reaction. After terminating the reaction, polymer latex and inorganic particles dispersed in water were coagulated and washed to remove the emulsifier, and then dried to obtain a powdered organic-inorganic mixture.

Comparative Example 1

The temperature of 400 g of a slurry of synthetic mica (Si:Mg:Al:Na=26.5:15.6:0.2:4.1) swollen in water was maintained at 10° C. As a cationic initiator, 3.8 g of 2,2-azobis-[2-(2-imidazolin-2-y-N-methyl)propane]dihydrochloride was prepared as a 2 wt % aqueous solution. The solution was dripped into the synthetic mica-dispersed slurry that was maintained at 10° C. for 2 hours, and it was further agitated for 40 minutes. Then, NaCl was removed through a filtering process and the remaining product was stored (organically modified synthetic mica (SM-C)).

40 g (15 wt %) of the prepared SM-C was introduced into a reactor, and 134 g of water and 39.7 g of methylmethacrylate and 0.28 g of acrylamide were introduced therein. The mixture was agitated at room temperature for 20 minutes, and polymerized at 70° C. for 2 hours. 6.67 g (3 wt %) of a potassium persulfate solution and 6.67 g (3 wt %) of a sodium bicarbonate solution as an initiator, and 24 g (5 wt %) of a sodium dodecylbenzene sulfonate solution were added thereto, and it was further polymerized at 80° C. for 6 hours to complete the reaction. After terminating the reaction, polymer latex and inorganic particles dispersed in water were coagulated and washed to remove the emulsifier, and then dried to prepare a powdered organic-inorganic mixture.

Experiment

Organic-inorganic polymer mixtures prepared in Examples 1 to 9 and in Comparative Example 1 were mixed with a polymer having a similar composition to the polymer prepared in polymerization to make total silicate contents 1 to 5 wt %. 0.1 weight parts of a mixture of HP2215FF[5,7-di-tert-butyl-3-(3,4-dimethylphenyl)-3-hydro-benzofuran-2-on: tris(2,4-ditert-butylphenyl-phosphate: pentaerythrotetrakis-(3-(3,5-di-tert-butyl-4-hydrophenyl)propionate of 15:57:28 wt % as an antioxidant, and 0.1 weight parts of glycerin monostearate were added thereto respectively, and it was melt-extruded in a twin screw extruder at 240° C. to prepare pellets of organic-inorganic nanocomposite. These pellets were melted to make circular samples with a thickness of 2 mm and a diameter of 50 mm.

Dispersibility and transparency of the prepared samples were measured as follows, and the results are shown in FIGS. 1 to 4 and Table 1.

Dispersibility—Exfoliation degree of silicate layers in organic polymer medium was observed using a transmission electronic microscope.

Transparency—Measured using UV/Vis spectroscopy (cary 3E, Varian Company)

TABLE 1

| | Transparency at 680 nm | Dispersibility measured with electronic microscope |
|---|---|---|
| Example 1 | 82 | Excellent |
| Example 2 | 83 | Excellent |
| Example 3 | 75 | Normal |
| Example 4 | 84 | Excellent |
| Example 5 | 79 | Fair |
| Example 6 | 82 | Excellent |
| Example 7 | 83 | Excellent |
| Example 8 | 76 | Normal |
| Example 9 | 85 | Excellent |
| Comparative Example 1 | 56 | Very Poor |

From Table 1, it can be confirmed that the organic-inorganic nanocomposites of Examples 1 to 9, which are prepared by adding monomers, an initiator, and an emulsifier to an ion-exchanged layered silicate salt that is prepared by adding a cationic initiator and a cationic chain transfer agent to a layered silicate and causing an ion-exchange reaction, have significantly improved dispersibility and permeability compared to the organic-inorganic nanocomposite of Comparative Example 1.

Figure 1:
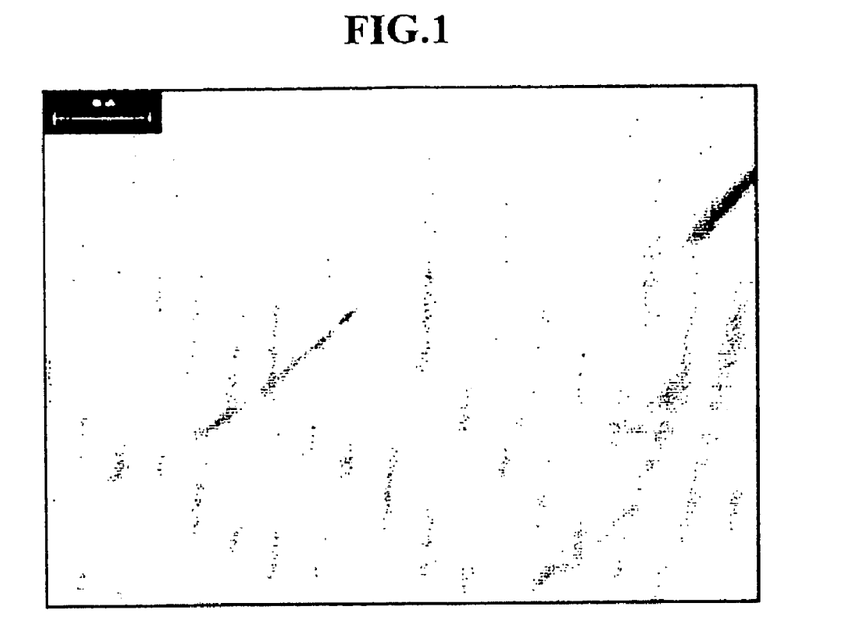
FIG. 1 is a photograph showing an exfoliation degree of silicate layers in an organic polymer medium of the organic-inorganic nanocomposite according to Example 1 of the present invention, using a transmission electronic microscope (×10,000).
Figure 2:
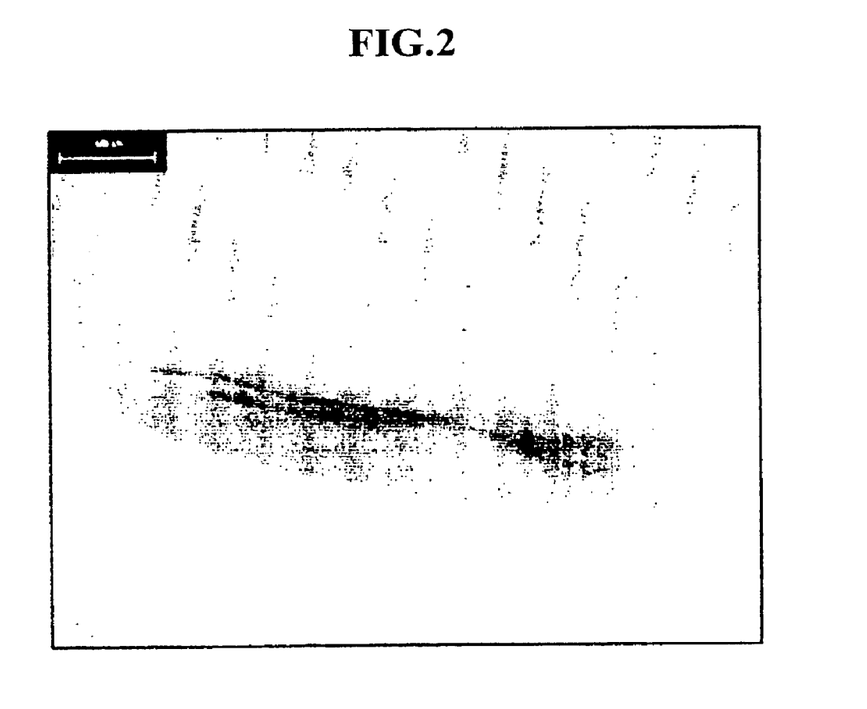
FIG. 2 is a photograph showing an exfoliation degree of silicate layers in an organic polymer medium of the organic-inorganic nanocomposite according to Example 1 of the present invention, using a transmission electronic microscope (×100,000).
Figure 3:
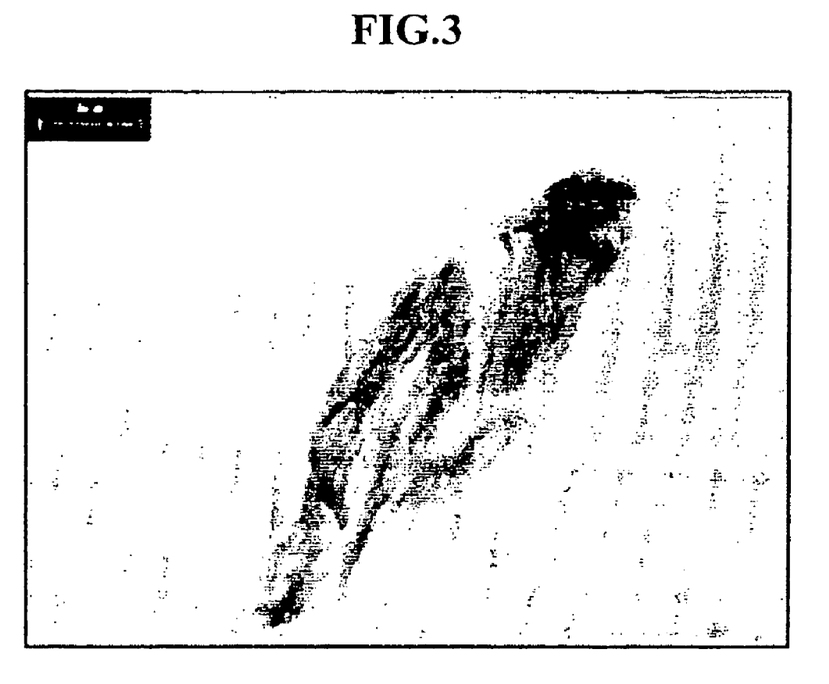
FIG. 3 is a photograph showing an exfoliation degree of silicate layers in an organic polymer medium of the organic-inorganic nanocomposite prepared in Comparative Example 1, using a transmission electronic microscope (×10,000).
Figure 4:
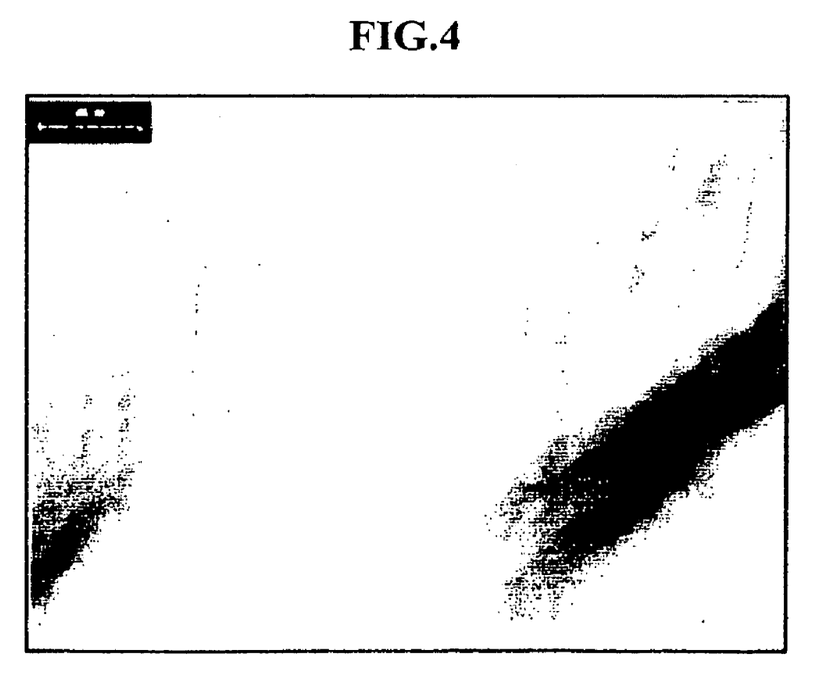
FIG. 4 is a photograph showing an exfoliation degree of silicate layers in an organic polymer medium of the organic-inorganic nanocomposite prepared in Comparative Example 1, using a transmission electronic microscope (×100,000).

In addition, as shown in FIGS. 1 and 2, the thickness of the most extensively deposited silicate in the organic-inorganic nanocomposite prepared in Example 1 is 50 nm, and most are exfoliated, and as shown in FIGS. 3 and 4, exfoliation did not occur in the organic-inorganic nanocomposite prepared in Comparative Example 1.

As explained, the organic-inorganic nanocomposite prepared according to the present invention can uniformly disperse layered silicate compounds in various kinds of polymer media.

What is claimed is:

1. An organic-inorganic nanocomposite composition, comprising:
   a) a layered silicate salt, wherein
      i) a cationic initiator and
      ii) a cationic chain transfer agent are ion-exchanged in a layered silicate compound; and
   b) a polymer medium;
   wherein the a) ii) cationic chain transfer agent is able to lead to living radical polymerization, represented by Chemical Formula 3:

[Chemical Formula 3]

(In the Chemical Formula 3,

Z is a hydrogen, a chlorine, an alkyl, an alkylthio, an alkoxycarbonyl, an aryoxycarbonyl (—COOR"), an carboxy (—COOH), an acyloxy (—O₂CR"), a cabamoyl (—CONR"), a cyano (—CN), a dialkyl-phosphonato, a diaryl-phosphonato (—P(═O)OR"₂), a dialkyl-phosphinato, a diaryl-phosphinato (—P(═O)R"₂) which contains or does not contain substitutents, R" is $C_{1-18}$ alkyl, $C_{18}$ alkenyl, aryl, heterocyclyl, aralkyl, or alkylaryl which contains or does not contain substitutents selected from the group of epoxy, alkoxycarbonyl, aryloxycarbonyl, isocyanto, cyano, silyl, haloyl, and dialkylamino, $R^1$ is $C_{1-18}$ alkyl, $C_{2-18}$ alkenyl, aryl, heterocyclyl, aralkyl, or alkylaryl which contains or does not contain substitutents selected from the group of hydrogen, ester, keto, amide, ether, thio, hydroxy, cyano, silyl, haloyl, and dialkylamino, and $R^2$ and $R^3$ are independently $C_{1-18}$ alkyl, $C_{2-18}$ alkenyl, aryl, heterocyclyl, aralkyl, or alkylaryl which contains or does not contain substitutents are selected from the group of hydrogen, ester, keto, amide, ether, thio, hydroxy, cyano, silyl, haloyl, and dialkylamino, and at least one of $R^2$ and $R^3$ contains ammonium salt represented by Chemical Formula 4 or Chemical Formula 5 having a cationic substitutent at its end):

[Chemical Formula 4]

(In the Chemical Formula 4:

$R^4$, $R^5$, and $R^6$ are independently an alkyl which contains branches, normal saturated or unsaturated alkyl which contain aryl substitutent, alkoxyalkyl, cyanoalkyl, or hydroxyalkyl, X is a halide or sulfate having a functional group capable of forming a salt or an anion),

[Chemical Formula 5]

(In the Chemical Formula 5,

The hetero ring is a ring compound having a 5,6-square shape, and can contain independently an alkyl or alkene, nitrogen can be 1 to 3, Q is a halide or a sulfate having a functional group capable of forming a salt or an anion).

2. The organic-inorganic nanocomposite composition according to claim 1, comprising a) 1 to 150 weight parts of the layered silicate salt, wherein i) 1 to 100 moles of the cationic initiator and ii) 10 to 100 moles of the cationic chain transfer agent are ion-exchanged for 100 moles of layered silicate compound;

b) 100 weight parts of the polymer medium;

c) 0.01 to 10 weight parts of an initiator; and d) 0.001 to 10 weight parts of an emulsifier.

3. The organic-inorganic nanocomposite composition according to claim 1, wherein the a) i) cationic initiator is represented by Chemical Formula 1 or Chemical Formula 2:

[Chemical Formula 1]

(In the Chemical Formula 1,

$A_1$ and $A_2$ are independently a hydrogen, a $C_{1-6}$ alkyl group, or cyano group, $A_3$ and $A_4$ are independently a hydrogen, alkyl, alkenyl, aryl, heteroaromatic, or heterocyclyl which contains or does not contain substitutents selected from the group of ester, keto, ether, and amide, and at least one of $A_3$ and $A_4$ contains an ammonium salt represented by Chemical Formula 4 or Chemical Formula 5 having a cationic substituent at its end), $T_1\text{-O—O-}T_2$  [Chemical Formula 2]

(In the Chemical Formula 2, $T_1$ and $T_2$ are independently an alkyl, alkenyl, aryl, heteroaromatic, or heterocyclyl, which contains or does not contain substitutents selected from the group of ester, keto, ether, and amide, and at least on of $T_1$ and $T_2$ contains an ammonium salt represented by the Chemical Formula 4 or the Chemical Formula 5 having a cationic substituent at its end):

[Chemical Formula 4]

(In the Chemical formula 4:

$R^4$, $R^5$, and $R^6$ are independently an alkyl which contains branches, normal saturated or unsaturated alkyl which contain aryl substitutent, alkoxyalkyl, cyanoalkyl, or hydroxyalkyl, X is a halide or sulfate having a functional group capable of forming a salt or an anion),

[Chemical Formula 5]

(In the Chemical formula 5,

The hetero ring is a ring compound having a 5,6-square shape, and can contain independently an alkyl or alkene, nitrogen can be 1 to 3,

Q is a halide or a sulfate having a functional group capable of forming a salt or an anion).

4. The organic-inorganic nanocomposite composition according to claim 1, wherein the a) layered silicate compound is selected from a group consisting of sodium montmorillonite, magnesium montmorillonite, calcium montmorillonite, nontronite, beidellite, volkonskoite, hectonite, saponite, saauconite, magadite, medmonite, kenyaite, vermiculate, sobockite, stevensite, rectonite, tarosovite, ledikite, and a mixture thereof.

5. A method for preparing an organic-inorganic nanocomposite composition comprising the steps of
   a) adding a cationic initiator and a cationic chain transfer agent to a layered silicate compound and causing an ion-exchange reaction to prepare an ion-exchanged layered silicate salt; and
   b) adding monomers, an initiator, and an emulsifier to the a) ion-exchanged layered silicate salt and causing polymerization.

6. The method for preparing an organic-inorganic nanocomposite composition according to claim 5, wherein the a) cationic initiator is represented by Chemical formula 1 or Chemical formula 2:

[Chemical Formula 1]

(In the Chemical formula 1,
$A_1$ and $A_2$ are independently a hydrogen, a $C_{1-6}$ alkyl group, or cyano group,
$A_3$ and $A_4$ are independently a hydrogen, alkyl, alkenyl, aryl, heteroaromatic, or heterocyclyl, which contains or does not contain substitutents selected from the group of ester, keto, ether, and amide, and at least on of $A_3$ and $A_4$ contains an ammonium salt represented by Chemical formula 4 or Chemical formula 5 having a cationic substituent at its end), $T_1$-O—O-$T_2$     [Chemical Formula 2]

(In the Chemical formula 2,
$T_1$ and $T_2$ are independently an alkyl, alkenyl, aryl, heteroaromatic, or heterocyclyl, which contains or does not contain substitutents selected from the group of ester, keto, ether, and amide, and at least one of $T_1$ and $T_2$ contains an ammonium salt represented by the Chemical formula 4 or the Chemical formula 5 having a cationic substituent at its end),

[Chemical Formula 3]

(In the Chemical formula 4,
$R^4$, $R^5$, and $R^6$ are independently an alkyl which contains branches, normal saturated or unsaturated alkyl which contain aryl substitutent, alkoxyalkyl, cyanoalkyl, or hydroxyalkyl,
X is a halide or sulfate having a functional group capable of forming a salt or an anion),

[Chemical Formula 5]

(In the Chemical formula 5,
The hetero ring is a ring compound having a 5,6-square shape, and can contain independently alkyl or alkene, nitrogen can be 1 to 3,
Q is a halide or a sulfate having a functional group capable of forming a salt or an anion).

7. The method for preparing an organic-inorganic nanocomposite composition according to claim 5, wherein the a) ii) cationic chain transfer agent is able to lead to living radical polymerization, represented by Chemical formula 3:

[Chemical Formula 3]

(In the Chemical formula 3,
Z is a hydrogen, a chlorine, an alkyl, an alkylthio, an alkoxycarbonyl, an aryoxycarbonyl (—COOR"), an carboxy (—COOH), an acyloxy (—$O_2$CR"), a cabamoyl (—CONR"), a cyano (—CN), a dialkyl-phosphonato, a diaryl-phosphonato (—P(=O)OR"$_2$), a dialkyl-phosphinato, a diaryl-phosphinato (—P(=O )R"$_2$) which contains or does not contain substitutents,
R" is $C_{1-18}$ alkyl, $C_{2-18}$ alkenyl, aryl, heterocyclyl, aralkyl, or alkylaryl which contains or does not contain substitutents selected from the group of epoxy, alkoxycarbonyl, aryloxycarbonyl, isocyanto, cyano, silyl, haloyl, and dialkylamino,
$R^1$ is $C_{1-18}$ alkyl, $C_{2-18}$ alkenyl, aryl, heterocyclyl, aralkyl, or alkylaryl which contains or does not contain substitutents selected from the group of hydrogen, ester, keto, amide, ether, thio, hydroxy, cyano, silyl, haloyl, and dialkylamino, and
$R^2$ and $R^3$ are independently $C_{1-18}$ alkyl, $C_{2-18}$ alkenyl, aryl, heterocyclyl, aralkyl, or alkylaryl which contains or does not contain substitutents are selected from the group of hydrogen, ester, keto, amide, ether, thio, hydroxy, cyano, siyl, haloyl, and dialkylamino, and at least one of $R^2$ and $R^3$ contains ammonium salt represented by the Chemical formula 4 or the Chemical formula 5 having a cationic substitutent at its end).

8. The method for preparing an organic-inorganic nanocomposite composition according to claim 5, wherein the b) polymerization is conducted at 20 to 120° C.

9. The organic-inorganic nanocomposite composition according to claim 2, wherein the a) layered silicate compound is selected from a group consisting of sodium montmorillonite, magnesium montmorillonite, calcium montmorillonite, nontronite, beidellite, volkonskoite, hectonite, saponite, saauconite, magadite, medmonite, kenyaite, vermiculate, sobockite, stevensite, rectonite, tarosovite, ledikite, and a mixture thereof.

10. The organic-inorganic nanocomposite composition according to claim 3, wherein the a) layered silicate compound is selected from a group consisting of sodium montmorillonite, magnesium montmorillonite, calcium montmorillonite, nontronite, beidellite, volkonskoite, hectonite, saponite, saauconite, magadite, medmonite, kenyaite, vermiculate, sobockite, stevensite, rectonite, tarosovite, ledikite, and a mixture thereof.

11. An organic-inorganic nanocomposite composition, comprising:
   a) 1 to 150 weight parts of a layered silicate salt, wherein
   i) 1 to 100 moles of a cationic initiator and ii) 10 to 100 moles of a cationic chain transfer agent are ion-exchanged in 100 moles of a layered silicate compound;

b) 100 weight parts of a polymer medium;

c) 0.01 to 10 weight parts of an initiator; and d) 0.001 to 10 weight parts of an emulsifier.

12. The organic-inorganic nanocomposite composition according to claim 11, wherein the a) layered silicate compound is selected from a group consisting of sodium montmorillonite, magnesium montmorillonite, calcium montmorillonite, nontronite, beidellite, volkonskoite, hectonite, saponite, saauconite, magadite, medmonite, kenyaite, vermiculate, sobockite, stevensite, rectonite, tarosovite, ledikite, and a mixture thereof.

13. The organic-inorganic nanocomposite composition according to claim 11, wherein the a) i) cationic initiator is represented by Chemical formula 1 or Chemical formula 2:

[Chemical Formula 1]

(In the Chemical formula 1, $A_1$ and $A_2$ are independently a hydrogen, a $C_{1-6}$ alkyl group, or cyano group,

$A_3$ and $A_4$ are independently a hydrogen, alkyl, alkenyl, aryl, heteroaromatic, or heterocyclyl, which contains or does not contain substitutents selected from the group of ester, keto, ether, and amide, and at least one of $A_3$ and $A_4$ contains an ammonium salt represented by Chemical formula 4 or Chemical formula 5 having a cationic substituent at its end),

[Chemical Formula 2]

(In the Chemical formula 2, $T_1$ and $T_2$ are independently an alkyl, alkenyl, aryl, heteroaromatic, or heterocyclyl, which contains or does not contain substitutents selected from the group of ester, keto, ether, and amide, and at least on of $T_1$ and $T_2$ contains an ammonium salt represented by the Chemical formula 4 or the Chemical formula 5 having a cationic substituent at its end):

[Chemical Formula 4]

(In the Chemical formula 4:

$R^4$ $R_5$, and $R^6$ are independently an alkyl which contains branches, normal saturated or unsaturated alkyl which contain aryl substitutent, alkoxyalkyl, cyanoalkyl, or hydroxyalkyl, X is a halide or sulfate having a functional group capable of forming a salt or an anion),

[Chemical Formula 5]

(In the Chemical formula 5,

The hetero ring is a ring compound having a 5,6-square shape, and can contain independently an alkyl or alkene, nitrogen can be 1 to 3,

Q is a halide or a sulfate having a functional group capable of forming a salt or an anion).

14. The organic-inorganic nanocomposite composition according to claim 13, wherein the a) layered silicate compound is selected from a group consisting of sodium montmorillonite, magnesium montmorillonite, calcium montmorillonite, nontronite, beidellite, volkonskoite, hectonite, saponite, saauconite, magadite, medmonite, kenyaite, vermiculate, sobockite, stevensite, rectonite, tarosovite, ledikite, and a mixture thereof.

15. The organic-inorganic nanocomposite composition according to claim 13, wherein the a) ii) cationic chain transfer agent is able to lead to living radical polymerization, represented by Chemical formula 3:

[Chemical Formula 3]

(In the Chemical formula 3,

Z is a hydrogen, a chlorine, an alkyl, an alkylthio, an alkoxycarbonyl, an aryoxycarbonyl (—COOR"), an carboxy (—COOH), an acyloxy (—O$_2$CR"), a cabamoyl (—CONR"), a cyano (—CN), a dialkyl-phosphonato, a diaryl-phosphonato (—P(=O)OR"$_2$), a dialkyl-phosphinato, a diaryl-phosphinato (—P(=O)R"$_2$) which contains or does not contain substitutents, R" is $C_{1-18}$ alkyl, $C_{2-18}$ alkenyl, aryl, heterocyclyl, aralkyl, or alkylaryl which contains or does not contain substitutents selected from the group of epoxy, alkoxycarbonyl, aryloxycarbonyl, isocyanto, cyano, silyl, haloyl, and dialkylamino,

$R^1$ is $C_{1-18}$ alkyl, $C_{2-18}$ alkenyl, aryl, heterocyclyl, aralkyl, or alkylaryl which contains or does not contain substitutents selected from the group of hydrogen, ester, keto, amide, ether, thio, hydroxy, cyano, silyl, haloyl, and dialkylamino, and $R_2$ and $R_3$ are independently $C_{1-18}$ alkyl, $C_{2-18}$ alkenyl, aryl, heterocyclyl, aralkyl, or alkylaryl which contains or does not contain substitutents are selected from the group of hydrogen, ester, keto, amide, ether, thio, hydroxy, cyano, silyl, haloyl, and dialkylamino, and at least one of $R_2$ and $R_3$ contains ammonium salt represented by Chemical formula 4 or Chemical formula 5 having a cationic substitutent at its end).

16. The organic-inorganic nanocomposite composition according to claim 15, wherein the a) layered silicate compound is selected from a group consisting of sodium montmorillonite, magnesium montmorillonite, calcium montmorillonite, nontronite, beidellite, volkonskoite, hectonite, saponite, saauconite, magadite, medmonite, kenyaite, vermiculate, sobockite, stevensite, rectonite, tarosovite, ledikite, and a mixture thereof.

17. An organic-inorganic nanocomposite composition, comprising:
   a) a layered silicate salt, wherein
      i) a cationic initiator and
      ii) a cationic chain transfer agent are ion-exchanged in a layered silicate compound; and
   b) a polymer medium;
   wherein the a) i) cationic initiator is represented by Chemical formula 1 or Chemical formula 2:

[Chemical Formula 1]

(In the Chemical formula 1,

$A_1$ and $A_2$ are independently a hydrogen, a $C_{1-6}$ alkyl group, or cyano group, $A_3$ and $A_4$ are independently a hydrogen, alkyl, alkenyl, aryl, heteroaromatic, or heterocyclyl, which contains or does not contain substitutents selected from the group of ester, keto, ether, and amide, and at least one of $A_3$ and $A_4$ contains an ammonium salt represented by Chemical formula 4 or Chemical formula 5 having a cationic substituent at its end), $T_1$O—O-$T_2$   [Chemical Formula 2]

(In the Chemical formula 2, $T_1$ and $T_2$ are independently an alkyl, alkenyl, aryl, heteroaromatic, or heterocyclyl which contains or does not contain substitutents selected from the group of ester, keto, ether, and amide, and at least on of $T_1$ and $T_2$ contains an ammonium salt represented by the Chemical formula 4 or the Chemical formula 5 having a cationic substituent at its end):

[Chemical Formula 4]

(In the Chemical formula 4:

$R^4$, $R^5$, and $R^6$ are independently an alkyl which contains branches, normal saturated or unsaturated alkyl which contain aryl substitutent, alkoxyalkyl, cyanoalkyl, or hydroxyalkyl, X is a halide or sulfate having a functional group capable of forming a salt or an anion),

[Chemical Formula 5]

(In the Chemical formula 5,

The hetero ring is a ring compound having a 5,6-square shape, and can contain independently an alkyl or alkene, nitrogen can be 1 to 3, Q is a halide or a sulfate having a functional group capable of forming a salt or an anion).

18. The organic-inorganic nanocomposite composition according to claim 17, wherein the a) layered silicate compound is selected from a group consisting of sodium montmorillonite, magnesium montmorillonite, calcium montmorillonite, nontronite, beidellite, volkonskoite, hectonite, saponite, saauconite, magadite, medmonite, kenyaite, vermiculate, sobockite, stevensite, rectonite, tarosovite, ledikite, and a mixture thereof.

* * * * *